UNITED STATES PATENT OFFICE 2,376,391

POLYMERIZATION OF BUTADIENES-1,3

Waldo L. Semon, Silver Lake, Ohio, assignor to The B. F. Goodrich Company, New York, N. Y., a corporation of New York No Drawing. Application March 25, 1941, Serial No. 385,151

9 Claims. (Cl. 260—84.5)

This invention relates to the polymerization of butadienes-1,3, and particularly to a method whereby butadienes-1,3 may be polymerized in an aqueous emulsion to form products closely resembling natural crude rubber.

The emulsion polymerization of butadienes-1,3 either alone or in admixture with other butadienes-1,3 or with other compounds copolymerizable therewith to form compositions of matter more or less resembling rubber is well known. It has been commonly observed, however, that the products of such polymerization often resemble vulcanized rubber rather than natural crude rubber in respect to solubility, plasticity, and processing characteristics. Thus it has often been found that the polymers were insoluble in, and, in some cases, not even swelled by benzene or acetone, and that they were tough, non-plastic materials which either would not homogenize on a mill or which were very difficult to mill and to subject to other ordinary processing operations for natural rubber.

I have now discovered a class of materials which modifies the emulsion polymerization of butadienes-1,3 in such a manner that polymers more nearly resembling natural crude rubber may be produced than when the polymerization is carried on in the absence of the materials of this invention. This class of materials, which I have termed "modifiers," consists of dialykylxanthogeno tetrasulfides. This class of materials has the structural formula

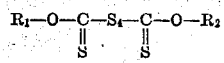

wherein $R_1$ and $R_2$ represent the same or different alkyl groups such as methyl, ethyl, n-propyl, isopropyl, n-butyl, ter-butyl, act. amyl, and di-2-ethylhexyl groups.

The effect of the dialkylxanthogeno tetrasulfides was shown by the copolymerization in aqueous emulsion at 30° C. of 75 parts by weight of butadiene and 25 parts of acrylonitrile in the presence of hydrogen peroxide as an initiator, and soap as an emulsifying agent. In the absence of any modifier, a non-plastic material was formed by the coagulation of the latex obtained as a product. When .4 part by weight of di-isopropylxanthogeno tetrasulfide were included in the emulsion during the polymerization, however, coherent, plastic, rubber-like materials were obtained. The unmodified polymer was practically insoluble in benzene, while the polymer obtained by polymerization in the presence of the modifier was 43% soluble in benzene. Completely soluble polymers may be obtained by employing greater amounts of dialkylxanthogeno tetrasulfide. Furthermore, vulcanizates prepared from the modified polymer have a higher elongation than those prepared from the unmodified material. Similar results are obtained when other dialkylxanthogeno tetrasulfides such as di-isobutylxanthogeno tetrasulfide and di-n-butylxanthogeno tetrasulfide are employed in place of the di-isopropylxanthogeno tetrasulfide of the specific example. The modifiers of this invention may also be employed in the polymerization of other monomeric systems such as mixtures of butadiene and methyl methacrylate, and mixtures of butadiene and styrene.

The proportion in which the modifier is included in the composition depends somewhat upon the properties desired in the product, the higher proportions of modifier in general producing softer, more soluble polymers. Very small amounts of modifier such as 0.1% or even less based on the monomers in the emulsion may profoundly affect the nature of the polymer produced, and amounts up to 5% or over may advantageously be employed.

Although the exact manner in which the modifiers of this invention function is not understood, it is believed from the nature of the changes in properties effected by polymerizing monomers in the presence of modifying agents that these materials in some way inhibit the formation of cross-linkages but still permit the formation of long, straight chains of the polymerizable monomers. It is believed that in the absence of some agent which serves to prevent or inhibit cross-linkage, the products of emulsion polymerizations which have been carried to completion contain numerous cross-linkages which affect the properties of the polymer in much the same manner as the cross-linkages formed during the vulcanization of natural crude rubber with the aid of sulfur change the properties of the crude rubber. This theory explains why the polymers prepared in the presence of modifying agents are in general more plastic and more soluble than unmodified polymers. This theory is presented only by way of explanation and is not intended as a limitation on the invention, for regardless of the correctness of the theory, the inclusion in emulsion polymerization batches of a dialkylxanthogeno tetrasulfide produces the beneficial results heretofore described.

The modifying agents of this invention may be employed in the polymerization in aqueous emulsion of butadiene-1,3 hydrocarbons by which is meant butadiene-1,3, or ordinary butadiene, and its homologs which polymerize in essentially the same manner such as 2,3-dimethylbutadiene, isoprene, or piperylene either alone or in admixture with each other or with other compounds copolymerizable therewith in aqueous emulsion to form rubbery copolymers. A number of materials which contain the group

wherein the dangling valences are attached to separate groups and which are believed to enter into polymeric chains only by 1,2-addition are known to be capable of copolymerizing with butadiene-1,3 hydrocarbons to form rubbery copolymers. This class of monomers includes such compounds as styrene, vinyl naphthalene, acrylonitrile, methacrylonitrile, methyl methacrylate, vinyl acetate, vinylidene chloride, methyl vinyl ketone, methyl vinyl ether, and similar unsaturated hydrocarbons, nitriles, esters, ketones, and ethers. These monomers are preferably, although not necessarily, employed in smaller amounts than the butadiene-1,3 hydrocarbon.

The polymerization of the above materials in aqueous emulsion may be effected by various initiators of polymerization such as per-compounds including hydrogen peroxide, ammonium persulfate, potassium persulfate, and other per-acids, peroxides, and per-salts such as persulfates, perborates, percarbonates, and the like, as well as other types of initiators such as diazoaminobenzene, and dipotassium diazomethane disulfonate.

Any of the ordinary emulsifying agents such as fatty acid soaps including sodium oleate and sodium stearate, hymolal sulfates and sulfonates including sodium lauryl sulfate and sodium isopropyl naphthalene sulfonate, and salts of hymolal organic bases such as the hydrochloride of diethylaminoethyloleylamide, trimethylcetyl-ammonium methyl sulfate, etc., may be employed in the polymerization.

Although I have herein disclosed specific embodiments of my invention, I do not intend to limit the invention solely thereto, for it will be obvious to those skilled in the art that many variations and modifications are within the spirit and scope of the invention as defined in the appended claims.

I claim:
1. The method which comprises polymerizing a butadiene-1,3 hydrocarbon in an aqueous emulsion in the presence of a small amount of a dialkylxanthogeno tetrasulfide.

2. The method which comprises copolymerizing in aqueous emulsion a butadiene-1,3 hydrocarbon and a smaller amount of a compound which contains a

group and which is copolymerizable therewith in aqueous emulsion, in the presence of a small amount of a dialkylxanthogeno tetrasulfide.

3. The method which comprises copolymerizing in aqueous emulsion butadiene and a smaller amoun of a compound which contains a

group and which is copolymerizable therewith in aqueous emulsion, in the presence of a small amount of a dialkylxanthogeno tetrasulfide.

4. The method which comprises copolymerizing butadiene and acrylonitrile in an aqueous emulsion in the presence of a small amount of a dialkylxanthogeno tetrasulfide.

5. The method which comprises copolymerizing butadiene and acrylonitrile in an aqueous emulsion in the presence of a small amount of di-isopropylxanthogeno tetrasulfide.

6. The method which comprises copolymerizing butadiene and methyl methacrylate in an aqueous emulsion in the presence of a dialkylxanthogeno tetrasulfide.

7. The method which comprises polymerizing a butadiene 1,3 hydrocarbon in an aqueous emulsion in the presence of a small amount of di-isopropylxanthogeno tetrasulfide.

8. The method which comprises copolymerizing in aqueous emulsion butadiene and a smaller amount of a compound which contains a

group and which is copolymerizable therewith in aqueous emulsion, in the presence of a small amount of di-n-butylxanthogeno tetrasulfide.

9. The method which comprises copolymerizing in aqueous emulsion butadiene and a smaller amount of a compound which contains a

group and which is copolymerizable therewith in aqueous emulsion, in the presence of a small amount of di-isobutylxanthogeno tetrasulfide.

WALDO L. SEMON.